United States Patent
Bruwer et al.

(10) Patent No.: US 6,175,312 B1
(45) Date of Patent: Jan. 16, 2001

(54) ENCODER AND DECODER MICROCHIPS AND REMOTE CONTROL DEVICES FOR SECURE UNIDIRECTIONAL COMMUNICATION

(75) Inventors: Frederick Johannes Bruwer; Willem Smit; Gideon Jacobus Kühn, all of Pretoria (ZA)

(73) Assignee: Microchip Technology Incorporated, Chandler, AZ (US)

(*) Notice: Under 35 U.S.C. 154(b), the term of this patent shall be extended for 0 days.

This patent is subject to a terminal disclaimer.

(21) Appl. No.: 07/985,929

(22) Filed: Dec. 4, 1992

Related U.S. Application Data (63) Continuation-in-part of application No. 07/707,101, filed on May 29, 1991, now abandoned.

(30) Foreign Application Priority Data

| | | |
|---|---|---|
| May 29, 1990 | (ZA) | 90/4088 |
| Apr. 2, 1992 | (ZA) | 92/2402 |

(51) Int. Cl.⁷ .................................................. H04Q 9/00
(52) U.S. Cl. .............................. 340/825.3; 340/825.31; 340/825.34; 340/825.56; 380/262; 380/274
(58) Field of Search .................. 340/825.3, 825.31, 340/825.34, 825.2, 825.21, 825.56, 825.69, 825.72; 235/382.5; 307/10.2, 10.5; 361/172; 70/256; 380/23, 262, 274

(56) References Cited

U.S. PATENT DOCUMENTS

| | | |
|---|---|---|
| Re. 29,525 | 1/1978 | Willmott . |
| Re. 30,957 | 6/1982 | Feistel . |
| 2,405,500 | 8/1946 | Guanella . |

(List continued on next page.)

FOREIGN PATENT DOCUMENTS

| | | |
|---|---|---|
| 32 34 538 A1 | 3/1984 | (DE) . |
| 32 34 539 A1 | 3/1984 | (DE) . |
| 32 44 049 A1 | 9/1984 | (DE) . |
| 33 09 802 A1 | 9/1984 | (DE) . |
| 33 20 721 A1 | 12/1984 | (DE) . |
| 33 09 802 C2 | 7/1985 | (DE) . |
| 34 07 436 A1 | 8/1985 | (DE) . |
| 34 07 469 A1 | 9/1985 | (DE) . |
| 35 32 156 | 3/1987 | (DE) . |
| 36 36 822 C1 | 10/1987 | (DE) . |
| 0 043 270 | 1/1982 | (EP) . |
| 0 103 790 | 3/1984 | (EP) . |
| 0155378 | 7/1988 | (EP) . |
| 0154019 | 8/1988 | (EP) . |
| 0 311 112 | 4/1989 | (EP) . |
| 0 459 781 B1 | 12/1991 | (EP) . |
| 0 335 912 B1 | 3/1995 | (EP) . |
| 86 15170 | 6/1988 | (FR) . |
| 86 16549 | 6/1988 | (FR) . |

(List continued on next page.)

*Primary Examiner*—Edwin C. Holloway, III
(74) *Attorney, Agent, or Firm*—Baker Botts L.L.P.

(57) ABSTRACT

Encoder and decoder microchips suitable for use in secure unidirectional remote control devices. The encoder microchip includes circuits for performing and encoding function on an identification number embedded in the microchip and a combination of a characterization number and a stepping counter value, so as to generate a transmission value which is only decidable by a related decoding function having access to the same identification number. The decoder microchip includes circuits for decoding the transmission value into a decoded characterization number and a decoded counter value and circuits for comparing the decoded counter value with a decoded counter value range. The encoder and decoder microchips are also provided with means for synchronizing the decoder microchip with a particular encoder microchip which has generated a synchronization command.

10 Claims, 7 Drawing Sheets

U.S. PATENT DOCUMENTS

| | | |
|---|---|---|
| 3,646,580 | 2/1972 | Fuller et al. . |
| 3,716,865 | 2/1973 | Willmott . |
| 3,792,446 | 2/1974 | McFiggins et al. . |
| 3,798,359 | 3/1974 | Feistel . |
| 3,798,605 | 3/1974 | Feistel . |
| 3,845,277 | 10/1974 | Voss et al. . |
| 3,890,601 | 6/1975 | Pietrolewicz . |
| 3,906,348 | 9/1975 | Willmott . |
| 3,938,091 | 2/1976 | Atalla et al. . |
| 4,037,201 | 7/1977 | Willmott . |
| 4,064,404 | 12/1977 | Willmott et al. . |
| 4,072,158 | 2/1978 | O'Brien et al. . |
| 4,078,152 | 3/1978 | Tuckerman, III . |
| 4,138,735 | 2/1979 | Allocca et al. . |
| 4,143,368 | 3/1979 | Route et al. . |
| 4,178,549 | 12/1979 | Ledenbach et al. . |
| 4,195,196 | 3/1980 | Feistel . |
| 4,195,200 | 3/1980 | Feistel . |
| 4,196,310 | 4/1980 | Foreman et al. . |
| 4,218,738 | 8/1980 | Matyas et al. . |
| 4,304,962 | 12/1981 | Fracassi et al. . |
| 4,316,055 | 2/1982 | Feistel . |
| 4,326,098 | 4/1982 | Bouricius et al. . |
| 4,328,414 | 5/1982 | Atalla . |
| 4,380,762 | 4/1983 | Capasso . |
| 4,385,296 | 5/1983 | Tsubaki et al. . |
| 4,393,269 | 7/1983 | Konheim et al. . |
| 4,418,333 | 11/1983 | Schwarzbach et al. . |
| 4,426,637 | 1/1984 | Apple et al. ............. 340/825.65 |
| 4,445,712 | 5/1984 | Smagala-Romanoff . |
| 4,447,890 | 5/1984 | Duwel et al. . |
| 4,454,509 | 6/1984 | Buennagel et al. . |
| 4,509,093 | 4/1985 | Stellberger . |
| 4,529,980 | 7/1985 | Liotine et al. . |
| 4,535,333 | 8/1985 | Twardowski . |
| 4,574,247 | 3/1986 | Jacob . |
| 4,578,530 | 3/1986 | Zeidler . |
| 4,590,470 | 5/1986 | Koenig ................... 340/825.31 |
| 4,596,898 | 6/1986 | Pemmaraju . |
| 4,596,985 | 6/1986 | Bongard et al. ......... 340/825.69 |
| 4,599,489 | 7/1986 | Cargile . |
| 4,623,887 | 11/1986 | Welles, II . |
| 4,626,848 | 12/1986 | Ehlers . |
| 4,633,247 | 12/1986 | Hegeler . |
| 4,638,433 | 1/1987 | Schindler . |
| 4,652,860 | 3/1987 | Weishaupt et al. ...... 340/825.69 |
| 4,663,626 | 5/1987 | Smith . |
| 4,686,529 | 8/1987 | Kleefeldt ................. 340/825.69 |
| 4,695,839 | 9/1987 | Barbu et al. . |
| 4,703,359 | 10/1987 | Rumbolt et al. . |
| 4,716,301 | 12/1987 | Willmott et al. . |
| 4,720,860 | 1/1988 | Weiss . |
| 4,723,121 | 2/1988 | van den Boom et al. . |
| 4,734,680 | 3/1988 | Gehman et al. . |
| 4,737,770 | 4/1988 | Brunius et al. . |
| 4,739,398 | 4/1988 | Thomas et al. . |
| 4,743,898 | 5/1988 | Imedio . |
| 4,750,118 | 6/1988 | Heitschel et al. . |
| 4,754,255 | 6/1988 | Sanders et al. .......... 340/825.31 |
| 4,755,792 | 7/1988 | Pezzolo et al. . |
| 4,758,835 | 7/1988 | Rathmann et al. . |
| 4,761,808 | 8/1988 | Howard . |
| 4,779,090 | 10/1988 | Micznik et al. ......... 340/825.31 |
| 4,796,181 | 1/1989 | Wiedemer . |
| 4,799,061 | 1/1989 | Abraham et al. . |
| 4,800,590 | 1/1989 | Vaughan . |
| 4,802,114 | 1/1989 | Sogame . |
| 4,807,052 | 2/1989 | Amano . |
| 4,808,995 | 2/1989 | Clark et al. . |
| 4,825,200 | 4/1989 | Evans et al. . |
| 4,831,509 | 5/1989 | Jones et al. . |
| 4,835,407 | 5/1989 | Kataoka et al. .......... 307/10.5 |
| 4,845,491 | 7/1989 | Fascenda et al. . |
| 4,847,614 | 7/1989 | Keller ...................... 340/825.56 |
| 4,855,713 | 8/1989 | Brunius . |
| 4,856,081 | 8/1989 | Smith . |
| 4,864,494 | 9/1989 | Kobus, Jr. . |
| 4,878,052 | 10/1989 | Schulze . |
| 4,884,055 | 11/1989 | Memmola . |
| 4,885,778 | 12/1989 | Weiss . |
| 4,890,108 | * 12/1989 | Drori et al. .............. 341/176 |
| 4,905,279 | 2/1990 | Nishio . |
| 4,912,463 | 3/1990 | Li . |
| 4,914,696 | 4/1990 | Dudezak . |
| 4,922,168 | 5/1990 | Waggamon et al. . |
| 4,928,098 | 5/1990 | Dannhaeuser ........... 340/825.56 |
| 4,931,789 | 6/1990 | Pinnow . |
| 4,951,029 | 8/1990 | Severson . |
| 4,979,832 | 12/1990 | Ritter . |
| 4,980,913 | 12/1990 | Skret . |
| 4,988,992 | 1/1991 | Heitschel et al. . |
| 4,999,622 | 3/1991 | Amano et al. . |
| 5,023,908 | 6/1991 | Weiss . |
| 5,049,867 | 9/1991 | Stouffer . |
| 5,055,701 | 10/1991 | Takeuchi ................. 307/10.2 |
| 5,058,161 | 10/1991 | Weiss . |
| 5,060,263 | 10/1991 | Bosen et al. . |
| 5,103,221 | 4/1992 | Memmola ............... 340/825.31 |
| 5,107,258 | 4/1992 | Soum . |
| 5,109,221 | 4/1992 | Lambropoulos et al. . |
| 5,144,667 | * 9/1992 | Pogue ...................... 380/45 |
| 5,146,498 | 9/1992 | Smith . |
| 5,148,159 | 9/1992 | Clark et al. . |
| 5,159,329 | 10/1992 | Lindmayer et al. . |
| 5,166,953 | 11/1992 | Hershey et al. . |
| 5,168,520 | 12/1992 | Weiss . |
| 5,191,610 | 3/1993 | Hill et al. . |
| 5,193,210 | 3/1993 | Nicholas et al. . |
| 5,204,901 | 4/1993 | Hershey et al. . |
| 5,222,137 | 6/1993 | Barrett et al. . |
| 5,224,163 | * 6/1993 | Gasser ...................... 380/30 |
| 5,237,614 | 8/1993 | Weiss . |
| 5,239,584 | 8/1993 | Hershey et al. . |
| 5,252,960 | 10/1993 | Duhame . |
| 5,278,907 | 1/1994 | Snyder et al. . |
| 5,280,267 | 1/1994 | Reggiani . |
| 5,297,782 | 3/1994 | Dombrowski et al. . |
| 5,361,062 | 11/1994 | Weiss et al. . |
| 5,363,448 | 11/1994 | Koopman, Jr. et al. . |
| 5,365,225 | * 11/1994 | Bachhuber ............... 340/825.31 |
| 5,367,572 | 11/1994 | Weiss . |
| 5,381,445 | 1/1995 | Hershey et al. . |
| 5,410,147 | 4/1995 | Riza et al. . |
| 5,412,379 | 5/1995 | Waraksa et al. . |
| 5,414,418 | 5/1995 | Andros, Jr. . |
| 5,416,408 | 5/1995 | Berkcan et al. . |
| 5,420,925 | 5/1995 | Michaels . |
| 5,433,111 | 7/1995 | Hershey et al. . |
| 5,442,341 | 8/1995 | Lambropoulos . |
| 5,453,681 | 9/1995 | Berkcan et al. . |
| 5,471,668 | 11/1995 | Soenen et al. . |
| 5,473,318 | 12/1995 | Martel . |
| 5,479,512 | 12/1995 | Weiss . |
| 5,481,532 | 1/1996 | Hassan et al. . |
| 5,481,535 | 1/1996 | Hershey . |
| 5,481,539 | 1/1996 | Hershey et al. . |
| 5,485,519 | 1/1996 | Weiss . |
| 5,517,187 | 5/1996 | Bruwer et al. . |
| 5,598,475 | 1/1997 | Soenen et al. . |
| 5,657,388 | 8/1997 | Weiss . |
| 5,686,904 | 11/1997 | Bruwer . |

| | | | | | |
|---|---|---|---|---|---|
| 5,751,224 | 5/1998 | Fitzgibbon . | 2 131 992 | 6/1984 | (GB) . |
| 5,778,348 | 7/1998 | Manduley et al. . | 2 133 073 | 7/1984 | (GB) . |
| | | | 2 184 774 | 7/1987 | (GB) . |
| | FOREIGN PATENT DOCUMENTS | | WO/88/04433 | 6/1988 | (WO) . |
| | | | WO 96/37063 | 11/1996 | (WO) . |
| 2 051 442 | 1/1981 | (GB) . | 89/8225 | 10/1989 | (ZA) . |
| 2 099 195 | 12/1982 | (GB) . | | | |
| 2 118 614 | 11/1983 | (GB) . | * cited by examiner | | |

| CSR3 | CSR2 | CSR1 | CSR0 |
|------|------|------|------|

| CSR3 |
|------|

| PB | TP | 0 | 0 | 0 | 0 | TX1 | TX0 |
|----|----|---|---|---|---|-----|-----|

PB
0 PUSH BUTTON 1
1 PUSH BUTTON 2

TP
0 VOLATILE COUNTER
1 NON VOLATILE COUNTER

| TX1 | TX0 |               |
|-----|-----|---------------|
| 0   | 0   | TRANSMITTER 0 |
| 0   | 1   | TRANSMITTER 1 |
| 1   | 0   | TRANSMITTER 2 |
| 1   | 1   | TRANSMITTER 3 |

| CSR2 | MODE |
|------|------|

| AAH | NORMAL  | CODE |
|-----|---------|------|
| A5H | PANIC   | CODE |
| 55H | SYNC    | CODE |
| XXH | UTILITY | CODE |

| CSR1 | CSR0 | =COUNTER VALUE |
|------|------|----------------|

ENCODER AND DECODER MICROCHIPS AND REMOTE CONTROL DEVICES FOR SECURE UNIDIRECTIONAL COMMUNICATION

REFERENCE TO RELATED APPLICATIONS

The present application is a Continuation-in-Part of application Ser. No. 07/707,101, filed on May 29, 1991 now abandoned.

BACKGROUND OF THE INVENTION

1. Field of the Invention

This invention relates to security systems. More particularly, the invention relates to encoder and decoder microchips suitable for use in remote control devices for secure unidirectional communication, to remote control devices comprising the said microchips and to a security system suitable for secure unidirectional communication.

2. Discussion of the Background

Remote control via radio frequency or infrared media is well known and very popular for the control of car alarms, building alarms and automatic garage door equipment.

Conventional remote control systems which are based on a uni-directional transmission with only limited security features, are in common use and are available at relatively low prices.

More sophisticated devices based on bi-directional transmission systems and extensive handshaking, are also available on the market and are known to the applicant. However, because of their high cost and certain practical disadvantages, they are not widely used in commercial remote control devices.

The aforementioned conventional devices based on uni-directional transmission systems have two important short-comings in the context of a security application, namely firstly—the codes they are able to transmit are usually fixed and—secondly, the number of combinations of codes which they can transmit, is relatively small. Either of these short-comings can lead to access being given to unauthorized persons.

Such unauthorized access can be obtained by way of an exhaustive search, in which all the different combinations are tested to see if they are accepted, something which could be done in a matter of minutes if an appropriate apparatus is used. As an alternative, a recording could be made of a transmission and this could be retransmitted to gain access. As a result, such conventional uni-directional systems can be accessed without the use of authorized remote control or other security devices.

Improved security can be derived from the known principle of code stepping or code hopping. U.S. Pat. Nos. 4,835,407 and 4,827,614, German Patent No. 3,244,049 and German Patent Publications DE-OS-33 20 721, DE-OS 32 34 538, DE-OS-34 07 436 and DE-OS-34 07 469 describe this principle in more detail. South African Patent Specification No. 89/8225 also describes a code hopping remote control system which is similar to the one described in U.S. Pat. No. 4,847,614.

U.S. Pat. No. 4,847,614 describes the generation, by a transmitter, of a different code word after each previous transmitting operation. Such new code word is produced anew by linking, according to a given function, starting from a stored original code word and the previously transmitted code word. The receiver operates in exactly the same way and compares the new code word it generates, by the same method, with the code word received from the transmitter. If the two code words agree, the centrally controlled locking system of the vehicle in which the apparatus is installed, is activated. If there is non-agreement, additional code words, say n code words produced in sequence by the receiver, are compared. Thereafter, if non-agreement persists after the n code words, the receiver switches over to an increased security mode wherein two successive code words transmitted in sequence must be successfully compared before the central locking system of the vehicle is activated. This double comparison must take place within the next m code words generated at the receiver.

If the transmitting device and the receiving device are out of step by more than m+n, another signal is used to indicate to the receiver that it must search through its entire set of code words in an attempt to synchronize.

An essential feature of this remote control apparatus is that the receiver merely compares the received code word with the code word generated by itself without decoding the received code word to its original elements. Thus, in the event of non-agreement, and this will occur very often if the system is widely used in RF-devices, because of accidental reception from other users, this apparatus changes to an increased security mode, which is user unfriendly.

When it is in the high security mode, the receiver will force the user to operate his/her transmitter more than once, which weakens the security offered by it as is explained hereunder.

This device thus suffers from the severe disadvantages that the double comparison must take place within the next m code words generated at the receiver and also that the receiver will be placed in the high security mode requiring the double comparison by any other transmitter having the transmission format. As an example, the following situation, which could occur frequently, should be considered. Two or more vehicles fitted with the same kind of prior art apparatus may be parked in the same parking lot. A transmission made by the owner of one of those vehicles will cause all the others to go into high security mode, requiring special action from their owners to enter them.

A further essential feature of this remote control device is that the "window" of disagreement which is still acceptable to the apparatus, is applied to the received code word and the code word generated by the receiver. If the code words are not the same with the first attempt, the receiver generates a second code word which is then compared with the received code word. This process may have to be repeated as many times as the size of the "window" which has been built into the receiver algorithm.

Depending on the electronics in which this process is carried out, the size of the "window" and also the extent of disagreement between the first received code word and the first code word generated by the receiver, the reaction time for this apparatus could vary from transmission to transmission, and could be lengthy.

However, a serious problem in the operation of the system results when the situation occurs that the transmitter and receiver are out of step by more than n+m steps.

It is taught by the aforementioned patent that another signal is to be supplied to the receiver to indicate to it that a total search must be done to achieve synchronization. Because of the enormous number of possible code words ($>10^9$), it could take several minutes to succeed. This patent even suggests that the user opens the transmitter and removes its batteries to facilitate a short search.

Both the above situations are user unfriendly. If this process is repeated often, it also presents a security risk. The battery removal suggestion further precludes the use of non-volatile memory elements (EEPROM) for the counter of the transmitter. The use of EEPROM in the transmitter would have offered several advantages such as the elimination of standby power requirements, a longer battery life, fewer synchronization actions required and a guaranteed forward stepping (higher security).

If this system must be expanded to decode two or more transmitters it will have to step through 2 (or more)×n code words if an unauthorized code word is received.

SUMMARY OF THE INVENTION

It is an object of the present invention to provide encoder and decoder microchips for use in a remote control system of increased security, of which the user friendliness has not been unduly sacrificed, comprising a transmitter remote control device and a receiver remote control device, wherein the transmitter remote control device comprises the encoder microchip, the encoder microchip forming part of an electronic circuit adapted to transmit a coded transmission value decidable by the decoder microchip, and wherein the receiver remote control device comprises the decoder microchip, the decoder microchip forming part of an electronic circuit adapted to receive and to decode the coded transmission. The higher security remote control systems can be used for control of garage doors, security gates, vehicle alarm systems or any other remotely control device with a requirement for security.

It is a further object of the invention to provide a security system in which synchronization of the transmitter and receiver remote control devices can be achieved by a simple yet reliable and secure manner.

According to one aspect of the present invention, there is provided an encoder microchip comprising:

means for storing an identification number;

means for storing a characterization number comprising information selected from a group consisting of information identifying a status of the encoder microchip, information identifying a mode of operation of the encoder microchip, information representing a command, and information identifying a unit number of the encoder microchip;

means for storing a stepping counter value;

means for increasing the value of said stepping counter value each time the encoder microchip is operated;

means for combining said identification number with said characterization number and said stepping counter value to yield a combined number; and encoding means for performing a non-linear encoding function on said combined number, so as to generate a transmission value which, upon application thereof of a related decoding function by decoding means forming part of a matched decoder microchip which further comprises means for storing said identification number, is decoded to said characterization number and said stepping counter value.

Separate means may be provided to store one or more of the different kinds of information making up the characterization number.

The encoding function may be described by the following equation:

$$f_{encode}(\text{Identification number, (characterization number, counter value)}) = \text{transmission value}.$$

The characterization number may be a composite number and may comprise information about the mode of operation, the system configuration, the unit itself, a command or a status of the encoder microchip.

The encoding and related decoding functions are, as stated above, non-linear functions. This type of function is often used in the field of cryptography and is usually chosen for its characteristics which prevent or at least inhibit the prediction of its next output even though the non-linear function as well as previous outputs thereof may be known, as long as the identification number (PIN) remains unknown.

The term "a related non-linear decoding function" indicates a mathematical relationship between two functions in which one function performs an operation such as to square or to cube a given value and the other takes the corresponding root of the result. The same applies to functions such as differentiation and integration. Addition and subtraction as well as multiplication and division are also examples of related mathematical functions but they are linear as opposed to non-linear functions.

The characterization number may be at least a one bit value. Although it may extend into thousands of bits and even more, it will be appreciated that the longer the characterization number, the greater the security it offers but the more expensive the microchip becomes.

The counter value is also preferably of more than one bit length and may also extend into thousands of bits and even more, which will, as would be appreciated, increase the security. The longer the counter value, however, the higher the cost.

It has been found that a 16 bit characterization number and a 16 bit counter value, when combined, give adequate security because they could each individually be combined in more than 65,000 different combinations and together they could be combined in more than 4000 million combinations. Similarly, the identification number is preferably of more than a one bit length and is preferably as long as 64 bits in which case more than $10^{19}$ different combinations are possible.

The transmission value is preferably at least 16 bits long. It will be appreciated that if it is of a length less than 16 bits, it will be less secure and consequently it will be easier to be decoded.

The encoder microchip may also comprise synchronization means for generating, when operated, a synchronization counter value so that, upon combination thereof by said combination means with said identification number and said characterization number, a synchronization combined number is yielded, said synchronization combined number being encoded by said encoding means performing said non-linear encoding function thereon, so as to generate a synchronization transmission value which, upon application thereon of said related decoding function by said decoding means of said decoder microchip, causes synchronization of said decoder microchip with said encoder microchip by resetting said stepping counter value of the decoder microchip to be the same as or related to the stepping counter value of the encoder microchip.

The encoder microchip may be one of a set of microchips and said characterization number may contain information selected from a group consisting of information which identifies the encoder microchip as one of said set of microchips, information identifying a means for storing the stepping counter value as one of volatile and non-volatile, and information identifying the mode of operation of the encoder microchip.

According to another aspect of the invention, there is provided a decoder microchip comprising:

means for storing a second identification number which is the same as the identification number of the encoder microchip;

means for receiving said transmission value from said encoder microchip;

means for combining said transmission value with said second identification number so as to yield a combination thereof;

means for performing a decoding function on said combination, so as to generate from said combination a decoded characterization number and a current decoded counter value; and means for storing a previously decoded counter value obtained from the decoding of a transmission value of a previous transmission.

According to a further aspect of the invention, there is provided a decoder microchip comprising:

means for performing a decoding function on a received transmission value and an identification number embedded in the decoder microchip, so as to generate from the transmission value, a decoded characterization number and a decoded counter value;

means for comparing the decoded counter value with a decoded counter value range;

means for recognizing, in the decoded unit number, a synchronization command; and means for storing the decoded counter value in the event of a valid transmission value having been received.

The decoder microchip may comprise means for performing a format scan on signals so as to identify and respond to valid transmission values.

The decoding function performed by the decoder microchip is preferably such as to ensure that the decoded characterization number and the decoded counter value are the same as, respectively, the characterization number and the counter value encoded by an encoder microchip having the same identification number as the decoder microchip.

The decoder microchip preferably also comprises distinguishing means for distinguishing between a decoded characterization number for normal operation and a decoded characterization number for synchronization purposes.

The decoder counter value may conveniently not be accepted by the decoder microchip as a valid counter value unless it is greater than the previously received valid counter value but less than the previously received valid counter value plus a value n, the value n constituting the number of lost codes the encoder microchip would still accept. Alternatively, in the event that the decoded characterization number comprises a valid synchronization command, the decoder microchip may be adapted to store the decoded counter value plus one as the decoder counter value for subsequent use.

The decoder microchip may, in addition, comprise means for comparing the counter value with a value obtained from a uni-directional synchronization process to which the decoder microchip may be subjected.

The invention also extends to a combined encoder/decoder microchip, comprising the means of each of the encoder and decoder microchips as hereinbefore disclosed.

According to a further aspect of the invention, there is provided a transmitter remote control device comprising encoder means and transmission means adapted to transmit a transmission value receivable by a receiver remote control device capable of responding thereto, the encoder means comprising means for performing an encoding function on an identification number embedded in the encoder means and a combination of a characterization number and a variable counter value as to generate a transmission value incorporated in the transmission, the transmission value being decodable through a related decoding function performed by the receiver remote control device.

The encoder means may be adapted to generate a stepping counter value through a uni-directional synchronization process for the synchronization of the encoder means of the receiver remote control device.

Also according to the invention, there is provided a receiver remote control device comprising decoder means comprising means for performing a decoding function on a combination of a transmission value and an identification number, so as to generate a decoded characterization number and a decoded counter value; and means for comparing the decoded counter value number with a counter value range.

The receiver remote control device is preferably provided with means for providing an output indicative of or in response to a valid transmission value it has received.

The receiver remote control device may further comprise means for comparing the decoded counter value with a decoded counter value obtained from a unidirectional synchronization process pre-performed on the receiver remote control device by a transmitter remote control device.

The counter values of both the encoder means and the decoder means may be retained by batteries or alternatively, by memory means.

In a preferred embodiment of the invention, electronic remote control apparatus is provided comprising encoder means for generating, when activated, a multi-bit code word by performing a function on a personal identification number (PIN) and a combination of a characterization number and a counter value. Preferably, the counter value is incremented every time the apparatus is activated.

The electronic remote control means preferably comprises transmitter means for generating a transmission comprising the multibit code word. Conveniently, the encoder means is further adapted to generate, upon activation of a synchronization process, a synchronization multibit code word, wherein the synchronization multibit code word is a function of a personal identification number embedded in the encoder means, and a combination of a synchronization command word and a new counter value.

The encoder means may further comprise panic means adapted to generate a panic command.

Additionally, the encoder means may comprise electrically erasable programmable memory mens or read and write memory means with standby mode means in the said encoder means to store the last counter value.

In order to facilitate the programming of a multibit personal identification number (PIN) into the memory means, the apparatus may comprise program means.

As an additional safety feature, the encoder means may comprise verification means for verifying the personal identification number without being able to read it, and means for locking an interface with the personal identification number (PIN), in order to bar all further attempts to change or verify the personal identification number.

In another preferred embodiment of the invention there is provided electronic remote control apparatus comprising decoder means for decoding the multibit code word received from the transmitter means.

The decoder means may be adapted to apply a function on the multibit code word received from the receiver in such a manner as to yield the characterization number and the counter value to which the encoding function has been applied.

Preferably the personal identification number (PIN) of the encoder means is the same as that of the decoder means, otherwise the characterization number and the counter value window of the decoder means would most probably not compare with the characterization number and counter value to which the encoder means had applied the function and the received code word would then be ignored.

The decoder means is preferably adapted
- to compare the decoded characterization number of the transmitted code word with its pre-embedded characterization number, and upon agreement,
- to check that the counter value falls inside a valid range of counter numbers, and if both conditions are satisfied,
- to give an indication thereof to the outside, in the form of a flag, and
- to store the received counter value if it was found to be valid.

The decoder means may further be adapted, if one of the conditions is not satisfied, to ignore the received multibit code word and to scan its input for another multibit code word.

Each of the encoder and decoder means may comprise means for programming, verifying and locking a personal identification number (PIN).

In addition, the decoder means may comprise means for storing the latest valid received counter value.

Further according to the invention, the encoder means may comprise means for recognizing, within a sequence of counter values, a false counter value, and means responsive thereto for preventing desynchronization. The means for preventing desynchronization may be adapted to also give a battery low indication.

Furthermore, the encoder means may comprise means for stepping the synchronization command word to prevent the same synchronization command word from being used illegitimately.

Also according to the invention, the decoder means may comprise means for recognizing a panic command generated in the encoder means, and means for responding thereto.

The decoder means may comprise means for recognizing other commands and/or more than one characterization number with independent counters, without having to perform the decoding process more than once.

The invention also extends to a security system comprising an encoder device as hereinbefore defined, a decoder device as hereinbefore defined and a communication channel suitable for the communication of configuration commands from the encoder device to the decoder device.

The invention thus provides means whereby an encrypted command can be transmitted by an encoder device to a decoder device and which is decryptable by the decoder device into a valid command for the execution of a desired function by suitable means controlled by the decoder device.

Thus, the invention also provides means for altering the system configuration and even the functionality of a security system or other remote control device without the risk of unauthorized alteration thereof. The invention further permits the remote and controlled upgrading or enhancement of a security system under the control of the manufacturer or its representative.

The security system in accordance with the invention may be configured such that changes could only be effected under conditions defined by the manufacturer, so as to minimize the statistical chances of unintentional modifications to its configuration.

The security system may be provided with volatile and/or non-volatile memory so that any changes made to its configuration could be a temporary or a permanent nature by being recorded respectively in the volatile or the non-volatile memory thereof.

The invention can also provide means to add a serial number, (that is not encoded with the non-linear encoding algorithm) to the transmission word. This number is transmitted as it is programmed into the encoder and would always be transmitted the same way.

This fixed code part can be used "self-learning" of transmitters and receivers in a secure way.

BRIEF DESCRIPTION OF THE DRAWINGS

The invention will now be described by way of a non-limiting example, with reference to the accompanying drawings in which.

DESCRIPTION OF THE PREFERRED EMBODIMENTS

Figure 1:
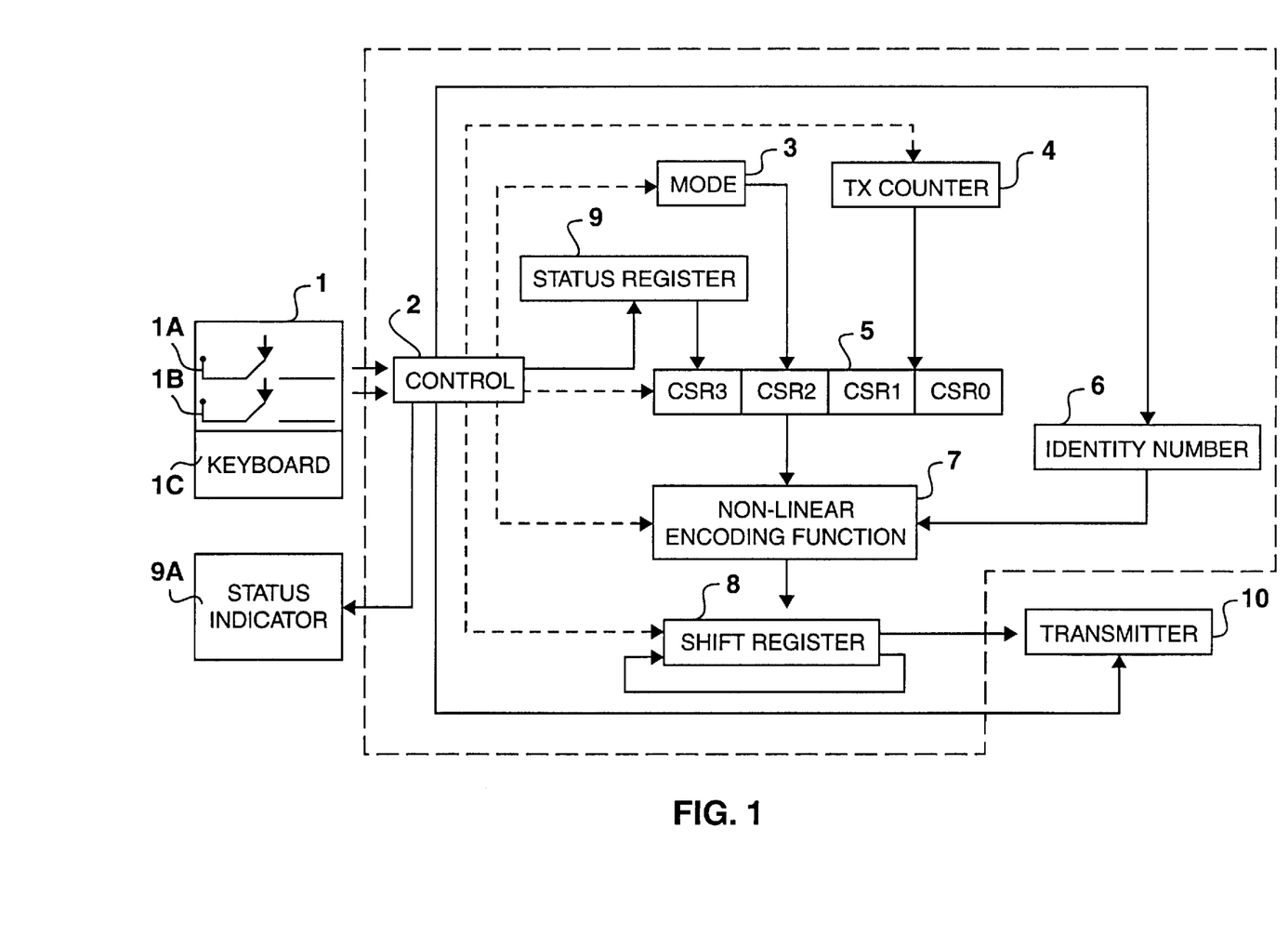
FIG. 1 is a block diagram of an encoder microchip in accordance with the invention.

Referring to FIG. 1, the encoder microchip receives an input from input interface 1 having a pair of push button switches (1A, 1B) and a keypad (1C), and comprises a control unit (2), a mode unit (3), a transmit counter (4), an input register (5) for holding an input word, an identification number register (6) for holding an identification number, logic means (7) for performing a non-linear function, a shift register (8) for holding an encoded value and repeatedly feeding the encoded value to a transmitter (10), a status register (9) for holding information about the configuration of the encoder microchip, and a status indicator 9A which provides operation information about the encoder microchip. The status register (9), the identification number register (6) and the transmit counter (4) are all registers or memory elements which can be programmed into the microchip and may be non-volatile (EEPROM) or volatile (RAM) memory with battery backup. As will be appreciated by those skilled in the art, the functions of the encoder microchip can be implemented in dedicated logic although a microprocessor based implementation is also possible. The control unit (2) comprises means for combining the respective values contained in the input register (5) and to operate the logic means (7) for performing the encoding functions. Thus the values contained in CSR2 and CSR3 (see below and FIG. 5) can be combined to yield a characterization number and the values contained in CSR0 and CSR1 (see below and FIG. 5) can be combined to yield a stepping counter value. The values in CSR2 and CSR3 may be entered, for instance, by the manufacturer, his agent or even the user, and further details thereof are given below.

Figure 2:
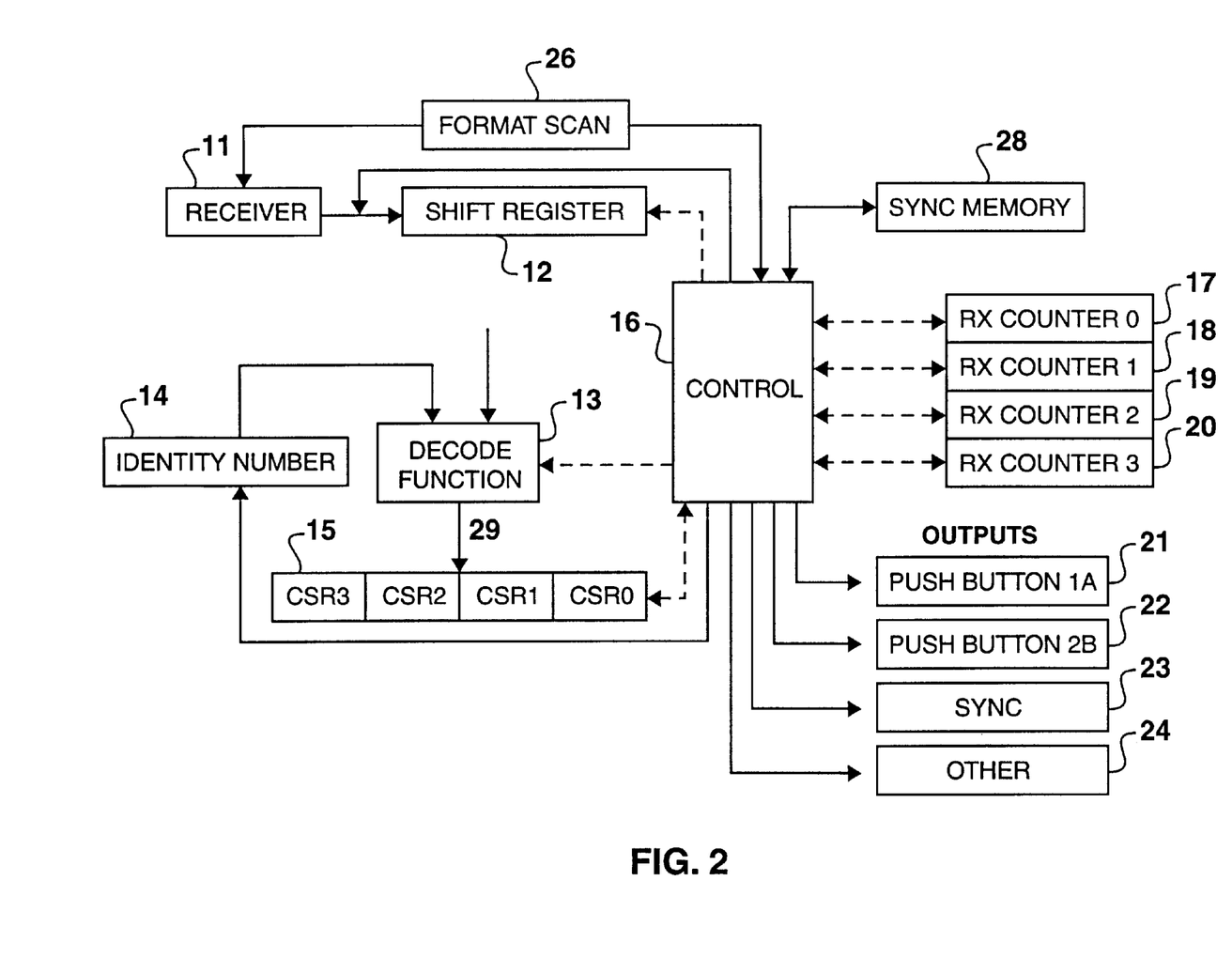
FIG. 2 is a block diagram of a decoder microchip in accordance with the invention.

Referring to FIG. 2, there is shown a receiver (11) for receiving a transmission value from the transmitter (10). The output of the receiver (11) is fed into a shift register (12). The value in the shift register (12) is decoded by decoding logic (13) using an identity number obtained from an identification number register (14). The result obtained from the decoding logic (13) comprises a decoded characterization number and a decoded counter value and is stored in a decoded result register (15). All the aforementioned steps are carried out under the control of a control unit (16). The decoder microchip also comprises four counter registers respectively numbered (17), (18), (19) and (20) in which decoder counter values may be stored and from where they may be compared with decoded counter values obtained by the control unit (16) from the decoded result register (15). The four counter registers store the respective counter values from four different transmitters (corresponding to the example of FIG. 5 having transmitters 0–3 using TX0 and TX1). Four outputs respectively numbered (21), (22), (23) and (24) are also provided and may be used by the control unit (16) to indicate what kind of information has been received. FIG. 2 shows, as an example, outputs indicating which push button has been activated (21, 22) and when the SYNC mode has been entered (23).

The decoder microchip further comprises format scan means (26) for scanning and verifying the format of any transmissions received by the receiver (11).

In order to prevent a synchronization value which has been used for one synchronization command, from being used for subsequent synchronization commands, synchronization memory means (28) are provided.

Figure 5:
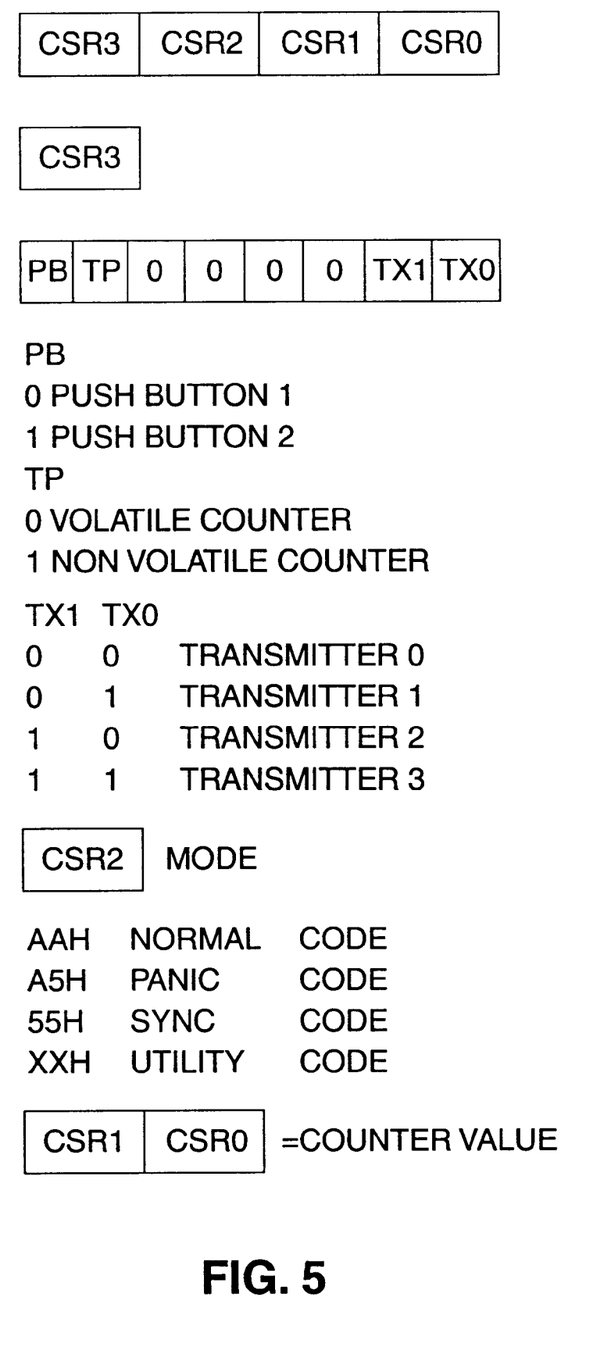
FIG. 5 is a preferred format for the characterization number and the counter value.

The identification number register (6) of the encoder is programmed by the user with a secret value to provide the security of the system. Although there may be millions of other users of exactly the same encoder (FIG. 1) and decoder (FIG. 2) microchips, every user will have a very high degree of security. A decoder microchip will only be able to correctly decode a transmission value that has originated in an encoder microchip when the same identity number is programmed into it. Furthermore, a specific encoder will also be defined by the value of its status register (9). The format of the status register is shown in FIG. 5.

The configuration and modes for a specific encoder must be programmed at manufacturing time as is an initial value for the stepping counter value (CSR1, CSR0). For example if a remote control system must have two transmitters then at manufacturing the two transmitters must be programmed with identical identification numbers each with their own transmitter number and an initial counter value. If the system is volatile and it is part of the characterization word definition as in the example in FIG. 5, this must also be indicated by programming it into the encoder. This can be done through hardwire or memory type methods.

The values CSR3, CSR2, CSR1 and CSR0 of the input register can be constructed in various ways to fit a specific application, usually comprising a characterization number or command value and a counter part. The implementation example given in FIG. 5, are determined as follows:
CSR3

The first bit of CSR3 has been assigned for purposes of indicating which push button switch (1A, 1B) is being used. Provision has been made for two push button switches (1A, 1B). The control unit (2) recognizes which of the two push button switches (1A, 1B) has been operated and then enters either a 0 or a 1 in the first bit. This information is fed into the first position of CSR3 via the status register (9), as shown in FIG. 5 as position PB.

The second bit of CSR3 has been allocated to "TP" which represents the technology of the transmit counter (4) and is set by the manufacturer of the encoder microchip. TP=0 for example indicates that the transmit counter (4) is volatile, while TP=1 for example indicates a non-volatile transmit counter (4). If only one type of transmit counter (4) is used, there will obviously be no need for this bit. It is, however, convenient to have this capability so that the receiver remote control device is capable of recognizing the type of transmit counter (4) employed by the transmitter remote control device, and so that it can act according to the information received. If a volatile counter is used, a standby battery or other source of power is required to keep the counter integrity intact. In non-volatile technology the counter can be expected to always increase until it over flows. The decoder can be programmed to handled an overflow situation (that will only happen after several years in most applications) automatically by recognizing that an overflow has occurred. For example the decoder will only block out say the 50,000 counter values proceeding the current counter value in the decoder. In the case of a 16-bit counter this would always leave roughly 15,000 valid counter values that will follow the current decoder counter value. The overflow boundary must be ignored and the decoder must then be programmed or designed to treat the counter as a cyclical device. If it is an encoder with volatile counters the decoder must always accept that the encoder counter can start anywhere and must accommodate this after a valid synchronization command has been received. A non-volatile system will therefore provide an extra level of security in this respect.

The last two bits of CSR3 have been allocated to "TX1" and TX0" respectively. As shown in FIG. 5, TX1 and TX0 can be used to make provision for a set of four different transmitter remote control devices which could be used in conjunction with a single remote control receiver device. With the combinations of 0's and 1's allocated to respectively TX1 and TX0 as shown in FIG. 5, the four transmitter remote control devices can each be uniquely identified. The values for TX1 and TX0 are selected in advance and introduced into the system originally according to the requirements of a particular application, such as where four people use the same vehicle fitted with a receiver remote control device according to the invention and each of the four persons has one transmitter remote control device in accordance with the invention. If more bits are allocated to designate the number of transmitters, more physical transmitters can be programmed to work with a decoder having the same identification number. If TX4, TX3, TX2, TX1 and TX0 are allocated, 32 transmitters can be identified by the decoder.

The transmitter number is important to distinguish between other various Rx-counter values that must be used to compare against the decoded stepping counter value. Although FIG. 2 only indicates four Rx counters, that is to correspond with the example in FIG. 5. If 32 transmitters are to be handled in a single decoder, that decoder would need 32 Rx counters in order to keep all transmitters in synchronization.

The specific value assigned to a specific transmitter can be hardwired into the status register (9) or if the status register (9) consists of non-volatile memory, can be reprogrammed from time to time (typically by the agent of the manufacturer).

The four bits in the middle of CSR3 can be used for a variety of different purposes. Any combination of 0's and 1's can be allocated to them. Thus, they may be used to indicate more transmitter remote control devices, remembering that one additional bit apart from TX1 and TX0 would allow the identification of 8 different transmitter remote control devices, etc.

Since the values of the different bits of CSR3 are included in the eventual coded word transmitted by the transmitter control device, it should be recognized that they also serve a security function.

CSR2

In the embodiment of the invention described, CSR2 is used for the mode indication (see FIG. 5). Its value is determined by the control unit (2) executing the steps indicated in FIG. 3, when either of the two push button switches (1A, 1B) is operated. In step 32, the control unit (2) tests which of the two push button switches (1A, 1B) has or have been operated. If the switch (1A) of the combination of switches (1A, 1B) allocated for NORMAL MODE has or have been operated, the control unit (2) will, in step 33, assign a value AAH to CSR2. If, however, the other push button switch (1B) has been operated, the control unit (2) will recognize that fact in step 32 and will then allocate the value XXH to CSR2, so as to ensure that the receiver remote control device will recognize that it should go into UTILITY MODE. The values AAH and XXH for respectively NORMAL MODE and UTILITY MODE were arbitrarily chosen with XXH indicating that several values can be chosen to indicate various different commands. If the push button switch (1) is kept closed, the control unit (2) will proceed through the various steps set out in the flow diagram of FIG. 3 until step 37 is reached, in which event the control unit (2) will clock PANIC MODE (arbitrarily chosen as A5H) into CSR2.

Figure 3:
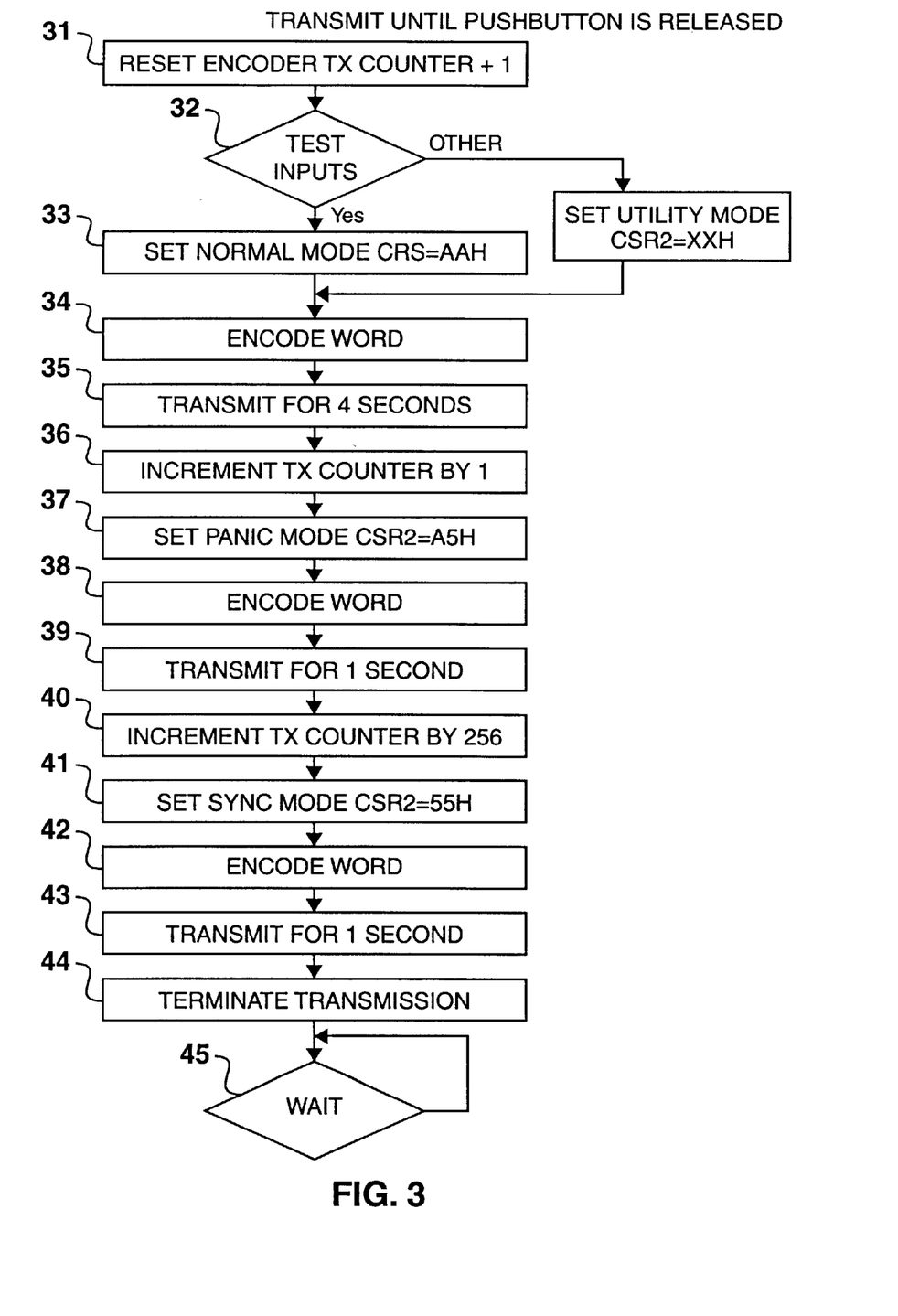
FIG. 3 is a flow diagram for the functions which the encoder microchip can perform.

If the push button switch (1) is closed long enough, the control unit will proceed through steps 31, etc., of the flow diagram, until step 41 is reached, at which stage the value 55H indicating SYNC MODE will be clocked to CSR2. This value will then be encoded together with CSR3, CSR1 and CSR0, as part of the characterization number.

Normal PANIC and SYNC MODES are activated according to the elapsed time of encoder activation according to the sequence described in FIG. 3. When first activated the encoder will select NORMAL MODE (see step 33 in FIG. 3). If the push button activation is not terminated before or during step 35, the encoder will proceed to select PANIC MODE as shown in step 37.

The UTILITY MODE is selected when inputs other than the NORMAL MODE inputs cause activation of the encoder. These inputs are tested in step 32 of FIG. 3 upon which the mode register 3 of FIG. 1 will be instructed to clock the selected UTILITY MODE code (indicated as XXH in the example in FIG. 5) into CSR2. The UTILITY MODE denotes a mode in which various preselected commands or other values can be loaded into CSR3–CSR0, prior to encoding.

The utility function can be used to indicate or relay various other commands or values to the receiver system via the decoder, such as system configuration commands and information. In this way the system configuration of a security system can be altered in a secure manner, by changing the relevant information contained in CSR2 and/or CSR3. If a predetermined command is selected the counter value can be replaced by configuration or other information relating to the selected command.

The decoder will be programmed so that upon recognizing the selected command, it will interpret the decoded counter value portion as a value relating to the selected command. This information can be passed to another microprocessor or used in the decoder microchip but it will not be compared to the previously decoded counter value. See item 24 in FIG. 2. Since the transmission value is still based on the encoded combined value, this can be used as a secure means for remote programming or remote configuration of equipment.

There can be more than one input (1) into the control device, which will also influence the status register value (9). Although the input interface (1) in FIG. 1 only shows some inputs, the input to the encoder can be a keypad, serial port or numerous push buttons or even a combination of these. Commands can be entered into CSR3 and CSR2 through the keypad or serial part. Information relating to the specific command can then be entered into CSR1 and CSR0. The identification number of a specific decoder can then also be entered. If the transmission value is then generated through the normal non-linear encoding process, the command would only make sense to a decoder with the identical identification number. The decoder will then relay the command and other information that was decoded to the rest of the system.

For example take a garage door remote control system that has a factory default automatic closing feature. Say the system would normally close the door one minute after it has been opened. If this timing is to be adjusted an encoder can be programmed with command and minute value. Say CSR2=39H is chosen by the manufacturer as meaning "adjust timing to value in CSR0", with the CSR0 value denoting minutes.

If the encoder is then programmed with:

$$CSR0 = 05H$$

$$CSR1 = XXH$$

$$CSR2 = 39H$$

$$CSR3 = XXH$$

a decoder that has correctly decoded the transmission value derived from these values in CSR3 to CSR0 will indicate to the receiver system a change of time to close to five minutes. Typically this should happen under additional constraints to reduce the chance of accidental adjustments. For example, the decoder would pass the command and CSR1 and CSR0 to the system. The system could be programmed to expect CSR2=39H, CSR0=minutes and CSR1=00H with another similar CSR2 and CSR0, but CSR1=01H decoded transmission value within one minute. The statistical chance of this happening by accident would be incredibly low.

In other applications a vehicle security system could be put into service override via remote control. This would obviously be something that can only happen under secure conditions. Because the command value is encoded as a function of the identification number it is always secure as long as the identification number is not known. To this end both the encoder and decoder prevent the identification number from being read out.

It should be clear that a remote programming unit can be constructed using the encoder microchip, an input mechanism and a transmission circuit. The keypad or serial port could also be used to change the identification number should this be required.

A transmitter can be configured such that depressing a first push button will effect normal operation while a second push button can cause the encoder to transmit another command, when pressed. This other command can be a panic (immediate) or service override for example.

The transmit counter (4) can be programmed with an initial value and will then increment every time the encoder is used to transmit a value.

Figure 6:
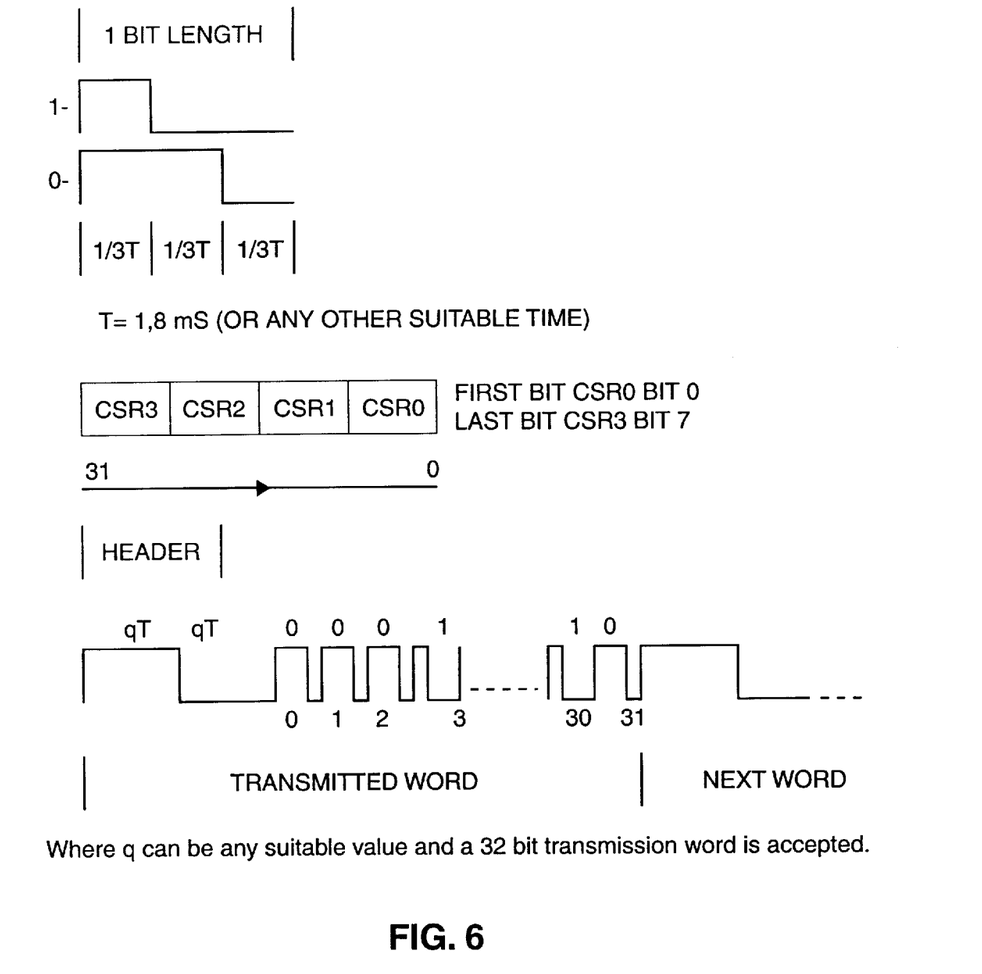
FIG. 6 is a preferred format for the transmission value.

The input word inputted to the encoding function (7) comprises the characterization number (CSR3 and CSR2 in the input register (5)) and the transmit counter value (CSR1 and CSR0 in the input register (5)). The non-linear encoding function (7) will use the identification number stored in the identification register (6) to map the input word to a transmission value that is stored in the transmission shift register (8). This value can be further encoded to form the transmission format as shown in FIG. 6. The pulse width modulation shown in FIG. 6 works well for radio frequency transmission, but other transmission formats can also be programmed into the encoder. For example the output format for infrared transmission would be different.

The non-linear function may be any non-linear function of sufficient complexity and which has a related decoding function, i.e., if the non-linear decoder function is applied to the transmission value using the same identification number, it will produce as a result the value that was in the input word.

The encoder operation is explained in the flow diagram of FIG. 3. When power is applied to the encoder microchip by pressing either one of the push button switches (1A, 1B), would perform its functions in the sequence indicated. It would first reset itself to a defined state in order to start with normal operation (step 31). It is important to recognize, as is stated at the top of FIG. 3, that the operation of the encoder can at any time be terminated by simply releasing the relevant push button switch (1A, 1B). If it is not terminated, it will sequentially execute the functions indicated in FIG. 3, until the wait loop (step 45) is reached. The encoder microchip will suspend its activities at this point and will perform no further functions until a reset function (step 31) is performed. The test shown in step (32) could be based on the inputs received from the push button switches (1A, 1B) to the control unit (2).

If the push button switch is held long enough, the flow will proceed until in step (35) the encoded word has been transmitted for up to 4 seconds. If the push button switch is still held, the flow will proceed up to step (37) which sets the PANIC MODE, and further to step (41) which sets the SYNC MODE. Whenever a push button is released for the flow diagram shown in FIG. 3, the device would immediately suspend its operation and would start at (31) if it is pushed again.

If power is applied to the encoder via the push buttons (1A, 1B) an error correction mechanism is required to ensure the integrity of the stepping counter. The transmission word (8) must be at least as long as the input word, but need not be the same length as the identification number. Security requirements dictate that the transmit counter (4) should be at least 16 bits long and so too the characterization number. This indicates that a good length for the transmission word is 32 bits. This provides ample security and is also practical in terms of transmission time and implementation costs.

The status indicator 9A provides operation information about the encoder microchip, such as the operation state. For, example an indicator such as a LED may be provided to indicate to the user the current mode. As described in FIG. 3, the encoder steps through the various modes as along as one of the push buttons (1A, 1B) are depressed and an LED could be provided for each mode.

Figure 4:
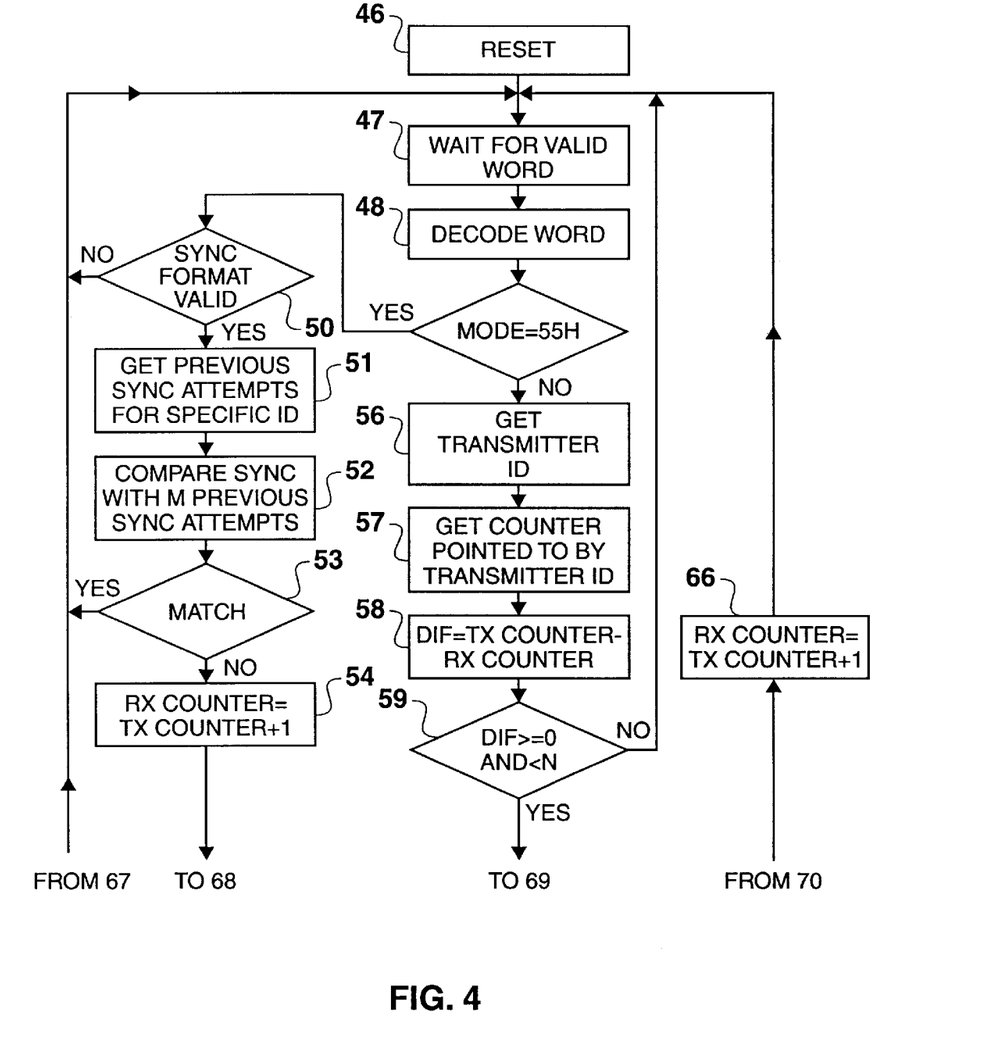
FIGS. 4 and 4*a* are a flow diagram for the functions which the decoder microchip can perform.
Figure 4A:
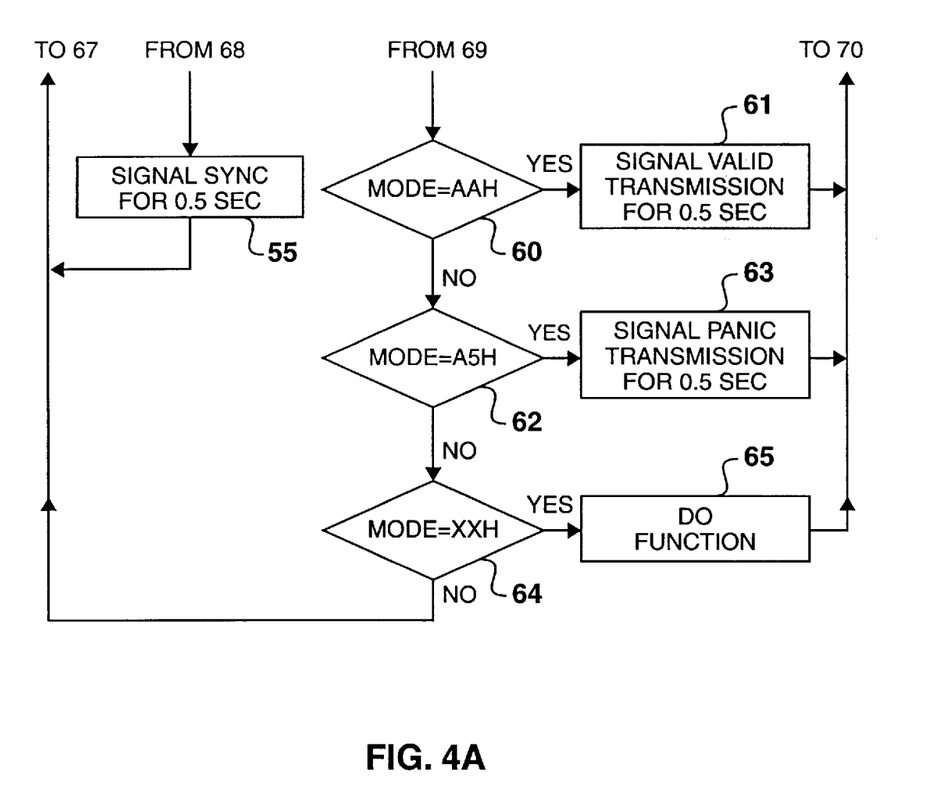

The functions and operation of the decoder microchip are substantially more complex and would be described with the help of simple examples. The block diagram in FIG. 2 shows the functional elements of the decoder microchip and the flow diagram in FIGS. 4 and 4a shows its operation.

It should be clear from the encoder description that all information bits to be transmitted are encoded with the non-linear encoding function. This has the effect that the transmission value (8) bears no obvious resemblance to the input word. However, at the decoder the information embedded in the input word must be recovered. When the decoder is powered up it will always go through an initialization or power up reset procedure (46).

The receiver (11) turns the transmitted signals, whether they are in the form of radio frequency, infrared waves or any other suitable medium, into a digital signal. This digital signal in the receiver (11) is continuously scanned (46, 47) for a word that conforms to the format such as shown in FIG. 6. Another format may be chosen if it has advantages. When a valid transmission word is recognized, it is moved into the decoder input shift register (12). The control (16) of the decoder microchip would then apply the decoding function (13) with inputs from the preprogrammed decoder identification number register (14), to the value in the input shift register (12). The result of this decoding operation (step 48) is stored in the decoded characterization number and decoded counter value result register (15).

The next operation (see step 49) is to compare the value in the CSR2 (see FIG. 5) which is part of the characterization number which is in turn part of the decoded result with the code for a synchronization command. If they compare, the decoder will proceed with operation (50) along the path on the flow diagram that shows the uni-directional synchronization operation. The decoder will check the rest of the decoded transmission word to see if it conforms to any other prescribed sync command format requirements. If it does not conform the decoder would ignore the received word and would return to scanning for another valid word (47). If it does confirm the decoder will check the sync command against previously received sync commands (51, 52, 53) to prevent replay actions. If it is valid the decoder would adjust its counter (54) to be equal to the received transmitter plus one. The decoder would also output a signal to show that it has just received a sync command (53).

If they do not compare, it will proceed to get (see step 56) the transmitter identity from the decoded result register (15). The control (16) will then calculate the difference (see step 58) between the decoded counter value and the corresponding Rx counter value (17, 18, 19, 20). If the difference is greater than or equal to zero but less than a value n, the decoded value is accepted as the result of an authorized or valid transmission. The value n is the number of lost codes which the system may be set up to handle.

In practice, this means that a remote control system comprising a transmitter and a receiver, i.e., an encoder and decoder set with identical identity numbers stored in identification registers (6, 14), does not have to remain in perfect synchronization.

For example, if n is say 100, then the transmitter, once it has been synchronized, can be activated, for instance, 98 times out of range of the receiver (dummy transmissions) and if on the 99th time it is activated, the transmission is within range of the receiver, the decoder performs one decoding operation and will then accept the transmission as valid. If, however, more than 100 (for n=100) dummy transmissions have taken place, the receiver will ignore all further transmissions from that transmitter until it receives a transmission value that decodes into a valid synchronization command.

If the decoded result was accepted as valid (step 59), the control can then determine what command was transmitted (steps 60, 62, 64) and can then take the desired action (steps 61, 63, 65), before returning to a state where it scans (step 47) for a valid word. The decoded counter value of a valid transmission will be incremented and stored (step 66) in the corresponding Rx counter register (17, 18, 19, 20). This means that once a transmission has been received as valid, the counter value of that transmission and all previous counter values will become unacceptable to that decoder microchip.

The uni-directional synchronization process is essential for establishing synchronization between a matched transmitter and receiver. If in operation (step 49) the transmission is recognized as possibly a synchronization command, the control unit will proceed to perform further tests to verify (step 50) that the format of the counter conforms to the requirements for a synchronization command. For example, the lower 8 bits of the decoded counter value must be zero. If the format does not conform to the specifications for a synchronization command, the control (16) takes the decoder microchip back to operation (47) and the decoded value is ignored.

If the decoded value passes test (50) the decoder will proceed to test the synchronization counter value against a previously valid synchronization operation (51, 52) and if it recognizes a repeat, the decoder will ignore this decoded word and will return to step (47). However, if the command passes to step (54) the decoder counter value will immediately be modified to the decoded value plus one. This value may be any possible value within the constraints of counter length and of course the format requirements of the synchronization command. The decoder will give an indication (in step 55) that it has accepted the new counter value. In an automotive application, this might be used to turn the flicker lights on and off as an indication to the user that synchronization has been achieved.

In terms of security, it should be noted that although the decoder counter has been synchronized, the decoder will still need to receive a valid transmission based on the new counter value before it will indicate a valid reception (see steps 61, 63, 65).

The synchronization command and for that matter any other command cannot be determined from an investigation of the transmission value, because of the non-linear effect of the encoding function and the fact that if forms part of the input word which gets encoded.

It is very important to achieve the highest possible security in the synchronization process because it has always been a weak point in conventional uni-directional systems. Because the window n can be large and EEPROM can be used to store counter values, synchronization will only rarely be required. Other users will have no effect on the operation of a matched encoder/decoder set. This set will automatically keep in step without any actions by the user.

Synchronization is a very simple and straightforward process with very limited impact on the user, since it takes only a few seconds and does not require any additional signals or actions. Because of the fact that synchronization values cannot be repeated in a non-volatile memory application, a high degree of security is offered by the system.

The outputs from the decoder can be as logic levels on designated output pins (e.g. valid push button 1A received, panic command received) or more complex outputs like a serial port that clocks out the complete decoded transmission word. The system coupled to the decoder would then be able to recognize any predetermined command as for instance which transmitter generated the transmission.

The invention relates specifically to the encoder and decoder microchips that facilitates the secure uni-directional transfer of information between a transmitter device (with encoder) and a receiver device (with decoder). Systems functioning according to this mention statistically eliminates scanning (stepping through codes) and key grabbing (record and replay) type of attacks. If a command is transferred to a receiver system via other encoder and decoder, the receiver must be preprogrammed to identify the decoded command. How the receiver acts on the command and the specifics of the commands do not form part of this invention.

Obviously, numerous modifications and variations of the present invention are possible in light of the above teachings. It is therefore to be understood that within the scope of the appended claims, the invention may be practiced otherwise than as specifically described herein. The claims which follow are to be considered an integral part of the disclosure.

What is claimed as new and desired to be secured by Letters Patent of the United States is:

1. A system comprising an encoder microchip and a decoder microchip, wherein the encoder microchip comprises:
   a circuit in which a first identification number is stored,
   a circuit in which a counter value is stored,
   a first logic circuit to change the value of the counter value only when the encoder microchip is operated, and
   a non-linear encoding circuit to encode the counter value using the first identification number to generate a transmission value decodable to provide the counter value;
   wherein the decoder microchip comprises:
      a circuit in which a second identification number is stored;
      a circuit in which the transmission value from the encoder microchip is received;
      a circuit in which the transmission value is decoded using the second identification number to generate from the transmission value a decoded counter value;
      a circuit in which a second decoded counter value obtained from a transmission value of a previous transmission is stored; and
      a circuit in which signals are scanned to identify signals conforming to a specific format.

2. An encoder microchip comprising:
   a circuit in which an identification number is stored;
   a circuit in which a counter value is stored;
   a first logic circuit to change the value of the counter value only when the encoder microchip is operated; and
   a non-linear encoding circuit to encode the counter value using the identification number to generate a transmission value decodable to provide the counter value.

3. The encoder microchip of claim 2, wherein the transmission value is only decodable by using the identification number.

4. The encoder microchip of claim 2, further comprising:
   a circuit to modulate the transmission value; and
   a circuit to transmit the modulated transmission value to a matched receiver remote control device.

5. An encoder microchip as claimed in claim 2, further comprising:
   a second logic circuit to form a unit number selected from the group consisting of information representing a command, information representing an input value, information representing a transmitter number and a constant value; and
   wherein the non-linear encoding circuit encodes the counter value and the unit number using the identification number to generate the transmission value.

6. An encoder microchip as claimed in claim 5, wherein the non-linear encoding circuit generates the transmission value decodable to provide the counter value and the unit number.

7. A decoder microchip comprising:

a circuit in which an identification number is stored;

a circuit in which at least a first counter value is stored;

an output circuit;

an input logic circuit to receive data;

a circuit in which the received data using the identification number is decoded to generate a second counter value;

a circuit in which the second counter value is compared with the first counter value;

a circuit in which the output circuit is activated if a comparison shows that the second counter value is within a defined range of the first counter value; and a circuit in which information relating to the second counter when the output circuit is activated is stored.

8. A decoder microchip according to claim 7, further comprising:

a circuit in which signals are received; and a circuit in which the received signals are scanned to identify and act on values of valid format.

9. A decoder microchip according to claim 7, wherein the output circuit, when activated, provides an indication of information contained in an accepted decoded transmission value.

10. A decoder microchip according to claim 7, wherein the activator circuit activates the output circuit only when the second counter value is within a forward range of the first counter value.

* * * * *